United States Patent [19]
Lippens et al.

[11] Patent Number: 6,026,741
[45] Date of Patent: Feb. 22, 2000

[54] BALE DENSITY CONTROL SYSTEM FOR AGRICULTURAL BALERS

[75] Inventors: Christiaan A. C. Lippens, Sint-Laureins; Dirk G. C. Leupe, Roeselare, both of Belgium

[73] Assignee: New Holland North America, Inc., New Holland, Pa.

[21] Appl. No.: 09/165,560

[22] Filed: Oct. 2, 1998

[51] Int. Cl.[7] ............................. A01F 15/04; B30B 15/26
[52] U.S. Cl. ............................ 100/41; 100/43; 100/49; 100/191
[58] Field of Search ...................... 100/35, 41, 43, 100/45, 49, 189, 191, 192; 56/341

[56] References Cited

U.S. PATENT DOCUMENTS

| | | | |
|---|---|---|---|
| 3,479,950 | 11/1969 | Freeman | 100/49 |
| 4,166,414 | 9/1979 | Fleming et al. | |
| 4,565,123 | 1/1986 | Sanders | 100/43 |
| 4,624,180 | 11/1986 | Strosser | |
| 4,627,341 | 12/1986 | Sudbrack et al. | 100/43 |
| 5,226,356 | 7/1993 | Schrag et al. | 100/41 |
| 5,253,570 | 10/1993 | Goeckner | 100/43 |

FOREIGN PATENT DOCUMENTS

| | | |
|---|---|---|
| 0223350 | 5/1987 | European Pat. Off. |
| 0389322 | 9/1990 | European Pat. Off. |

*Primary Examiner*—Stephen F. Gerrity
*Attorney, Agent, or Firm*—Larry W. Miller; Frank A. Seemar; J. William Stader

[57] ABSTRACT

An agricultural baler having a baling chamber and apparatus for loading successive charges of crop material into the chamber. The cross section of the baling chamber is automatically adjusted to the load experienced by the plunger during compression of these charges and thereby controlling the density of the bales formed therein. The density control system further comprises elements associated with the actuator of the baling chamber for precluding adjustment of the cross section when no new charge of crop material has been introduced into the baling chamber. These elements comprise a sensor sensing the passage of such charge along a wall portion of the baling chamber and a by-pass valve which controls the pressure of hydraulic oil provided to the actuator. Thus the cross section of the baling chamber is prevented from being reduced further when the baler is turned on headlands.

6 Claims, 5 Drawing Sheets

BALE DENSITY CONTROL SYSTEM FOR AGRICULTURAL BALERS

FIELD OF INVENTION

The present invention relates generally to an apparatus and a method for controlling the density of packages of crop material formed in the baling chamber of an agricultural baler, and more particularly, to an apparatus and a method involving means for sensing the force applied on said packages and means for sensing the introduction of new charges of crop material into this baling chamber. The invention has particular application to the interruption of the normal operation of the density control system under conditions when no charges of crop material are fed into the baler, as on headlands or when the baler is halted on the field.

BACKGROUND OF INVENTION

Conventional agricultural balers comprise a frame which is travelled on a pair of wheels over a field for picking up therefrom hay, straw or silage grass and feeding such crop material to a baling chamber in which it is compressed to parallelepiped packages under action of a plunger which reciprocates inside the baling chamber. When the packages have reached a predetermined length a tying mechanism is operated to encircle the completed package with a plurality of strands and to knot the strands ends together to form a finished bale which will be ejected out of the baler.

Commonly the baling chamber comprises at least one movable wall section whereof the position can be adjusted to modify the transverse cross section of the baling chamber and thereby vary the resistance met by the reciprocating plunger when a new charge of crop material is introduced into the chamber and thrust against the package. It is well known in the art to equip the movable wall section with actuator means to automatically adjust its position in response to load sensor means sensing the actual force by which the material in the baling chamber is compressed in order to adjust the density of the package to a predetermined value.

Such systems perform satisfactorily as long as new charges are introduced at a regular pace into the baling chamber. However, during normal baling operations, situations may occur where no or hardly any new material is introduced into the baling chamber. This may happen on the headlands, where the baler is turned and where no crop windrows are available, or in field patches where the crop density has fallen very low, e.g. because of crop infection. No material is introduced either when an operating baler is halted in the field. Under such conditions no substantial forces are encountered by the reciprocating plunger and the density control system might derive therefrom that further restriction of the baling chamber cross section is required to obtain the desired bale density. The longer the period no new material is introduced into the baling chamber, the more restricted the cross section of the baling chamber will be. However, at the first full charge of crop material, the restricted chamber may cause such resistance to the movement of the package that the blow of the plunger on this charge effects unacceptable stress on the structure and ruptures part of the baling mechanism. Important damage to the baler may be precluded by providing the drive line of the plunger with shear bolts which break and disconnect the plunger from the tractor drive line whenever such extraordinary forces are encountered. Such shear bolts are satisfactory for dealing with unforeseeable force peaks, but they will only cause frustration when used for coping with the more frequent effects of force amplification on or after turning the baler on headlands.

According to U.S. Pat. No. 4,166,414, issued Sep. 4, 1979 in the name of Garold L. Fleming, et al, the normal operation of the bale density control system may be interrupted by a control valve which is operated by the stuffer mechanism. When the stuffer mechanism does not cycle to introduce new crop material into the baling chamber, the valve precludes that pressurized oil is fed to the hydraulic actuator of the movable wall portion. Such system only works satisfactorily in balers having a stuffer mechanism which is operated in response to a complete filling of the feeder duct. Otherwise the system would not distinguish between conditions wherein new charges are introduced into the baling chambers and others wherein the stuffer mechanism is working idly. It requires a reliable sensor for assessing a complete filling of the duct further in order to preclude inopportune adjustment of the baling chamber.

In the prior art Model D1000 baler, manufactured by the predecessor company of New Holland North America, Inc., of New Holland, Pa., the plunger force was monitored by a pair of load cells which were mounted between the plunger body and the plunger crank arms, as shown in U.S. Pat. No. 4,624,180, issued Nov. 25, 1986 in the name of R. P. Strosser. Adjustment of the baler orifice was precluded when the peak forces of the plunger remained below a threshold level, which was thought to be indicative of an empty running plunger. However it was experienced that the accumulated crop package in the baling chamber expanded slightly after each compression stroke, such that the plunger still encountered a substantial force during the following stroke, although no new material was introduced into the baling chamber. Consequently the threshold level had to be set to a level which was impractically close to the normal bale density settings. When baling loose and resilient crop material such as straw, this system failed to operate reliably.

SUMMARY OF THE INVENTION

Therefore it is an object of the present invention to overcome the problems indicated above and to provide a density control system which assesses the introduction of charges of crop material in a more reliable manner.

According to one aspect of the present invention there is provided a density control system for an agricultural baler, which comprises a baling chamber comprising a plurality of walls, including at least one movable wall section; and means for introducing charges of crop material into the baling chamber and a plunger for compressing the charges to a package of the crop material therein; the density control system comprising: charge sensing means for sensing the introduction of a new charge of crop material into the baling chamber and generating an output indicative of the introduction; load sensing means for sensing the force applied on the charge during compression thereof and generating an output indicative of the force; and actuator means for adjusting the position of the movable wall section in response to the output of the load sensing means and the output of the charge sensing means in order to vary the density of the package of crop material. The density control system is characterized in that the charge sensing means are operable to sense the passage of a newly introduced charge of crop material along at least one wall portion of the baling chamber.

More particularly, the control system comprises means for precluding actuation of the actuator means when no passage of a new charge of crop material has been sensed. In this manner it is prevented that the cross section of the baling chamber is changed in response to the peak loads which occur when the plunger hits the expanding face of a crop package in the baling chamber. Advantageously these precluding means may be operable to preclude any movement of the movable wall section. Such system stabilizes the baling chamber while the baler is running idle on the headlands and prevents that the low forces encountered by the plunger engender an unwanted restriction of the section of the baling chamber.

When a new charge has been detected, the precluding means may enable the control of the actuator means in response to the output of load sensing means for a fixed time interval. Further means may be provided for enabling an increase in density of the package under conditions that said charge sensing means have sensed a new introduction of crop material into the baling chamber. These means may comprise a hydraulic control valve providing pressurized oil to another control valve which is connected to a hydraulic cylinder which positions the movable wall section.

Most advantageously the charge sensing means sense the movement of a pivotable member, such as a hay dog, which extends through a wall portion of the baling chamber.

According to another aspect of the present invention there is provided a unique method for controlling the density of packages of crop material in an agricultural baler.

The foregoing and other objects, features and advantages of the invention will appear more fully hereinafter from a consideration of the detailed description which follows, in conjunction with the accompanying sheets of drawings wherein one principal embodiment of the present invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
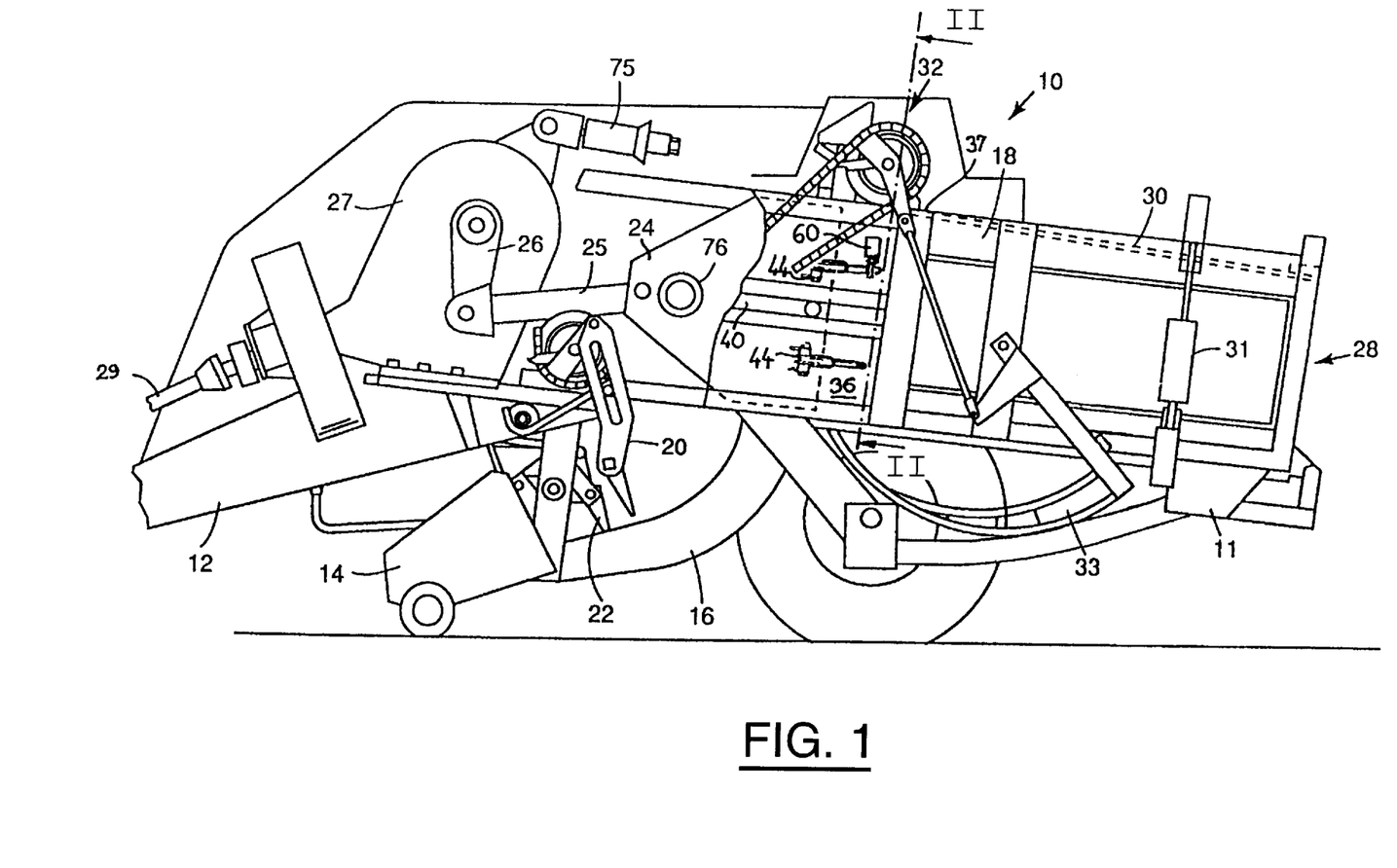
FIG. 1 is a side elevational view of an agricultural baler comprising a baling chamber and a system for con-trolling the density of packages of crop material formed therein.

FIG. 1 shows an agricultural baler 10 comprising a frame 11 which is equipped with a forwardly extending tongue 12 provided at its front end with hitch means (not shown) for coupling the baler 10 to a towing tractor. A pick-up assembly 14 lifts windrowed crop material off the field as the baler 10 is travelled thereover and delivers such material into the front end of a rearwardly and upwardly curved, charge-forming feeder duct 16. The duct 16 communicates at its upper end with an overhead, fore-and-aft extending baling chamber 18 into which crop charges are loaded by a cyclically operating stuffer mechanism 20. A continuously operating packer mechanism 22 at the lower front end of the feeder duct 16 continuously feeds and packs material into the duct 16 as to cause charges of the crop material to take on and assume the internal configuration of the duct 16 prior to periodic engagement by the stuffer 20 and insertion up into the baling chamber 18. The feeder duct 16 may be equipped with means (not shown) for establishing whether a complete charge has been formed therein and operating the stuffer 20 in response thereto. Each action of the stuffer 20 introduces a "charge" or "flake" of crop material from the duct 16 into the chamber 18.

A plunger 24 reciprocates in a fore-and-aft direction within the baling chamber 18 under action of a pair of pitman rods 25 which are linked to the crank arms 26 of a gearbox 27 driven by a transmission shaft 29 which is connected to the PTO shaft of the tractor. The reciprocating plunger 24 pushes each new charge introduced into the baling chamber 18 rearwardly and forms the subsequent charges into a package of crop material, which is forced by the same action of the plunger 24 toward a rearmost discharge aperture 28 of the chamber.

The baling chamber 18 comprises at least one movable wall portion 30 of which the position can be adjusted to vary the cross section of the aperture 28. Reduction of this cross section will increase the resistance to rearward movement of the crop packages and hence increase the density of the crop material contained therein. Similarly an enlargement of the cross section will reduce said resistance to rearward movement and hence equally reduce the density of the newly formed packages. The position of the wall portion 30 is controlled by actuator means comprising of a pair of hydraulic cylinders 31 (only one shown in FIG. 1) which are installed between the frame 11 and the wall portion 30.

Before leaving the confines of the baler 10, each package is securely bound in its final compacted form by a tying mechanism 32. The length of each bale produced by the baler 10 can be adjustably predetermined by conventional means not shown. The tying mechanism 32 comprises a series of periodically actuated needles 33 which are normally stationed in a stand-by condition below the chamber 18 but which, when actuated, swing upwardly through and across the baling chamber 18 to present twine to a corresponding series of knotters positioned on top of the chamber 18 and extending across the width of the latter.

Figure 2:
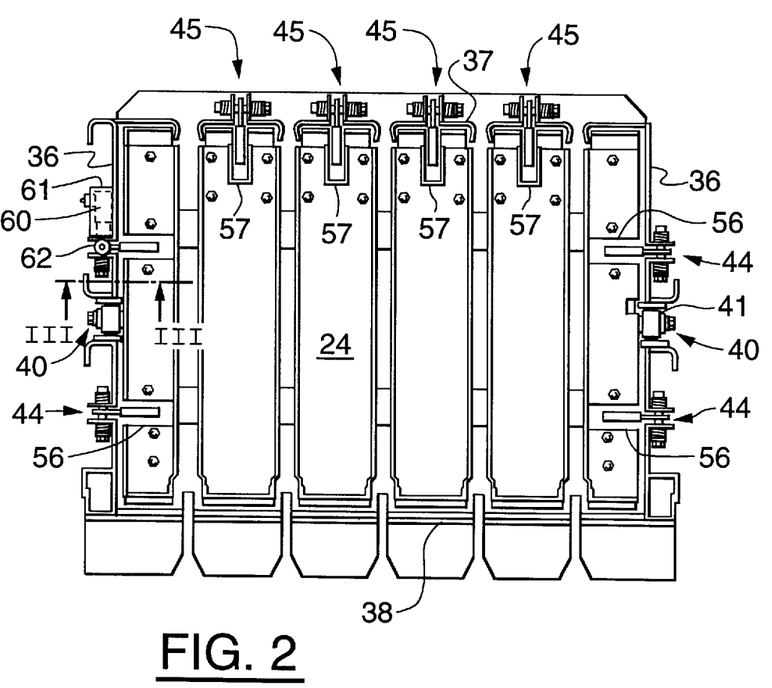
FIG. 2 is a vertical cross sectional view of the baling chamber, taken along line II—II in FIG. 1.

As shown in FIGS. 1 and 2, the baling chamber 18 comprises a pair of side walls 36, a top wall 37 and a bottom wall 38. The side walls 36 are provided with a longitudinal slot 40 for receiving therein the bearings 41 which support the plunger 24 during its reciprocation inside the baling chamber 18. The top wall 37 and bottom wall 38 are equally slotted to permit passage of the needles 33 and the twine therethrough during each tying cycle.

Figure 3:
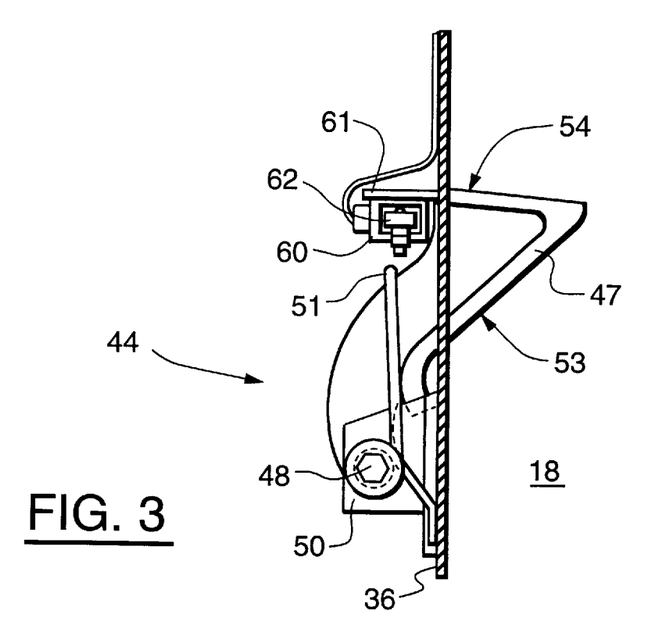
FIG. 3 is an enlarged cross sectional view of a wall portion of the baling chamber, taken along line III in FIG. 2.

Means are provided to retain the package of crop material after its compression by the plunger 24 in order to prevent forward expansion of the introduced charge of crop material while the plunger 24 is retracting. The retaining means comprise a pair of hay dog assemblies 44 mounted to each side wall 36 and a set of similar hay dog assemblies 45 mounted to the top wall 37. Each hay dog assembly 44 comprises a so-called hay dog 47 constituted by a pivotable member extending through a longitudinal slot in one of the side walls 36. As shown in FIG. 3, the hay dog 47 is mounted for pivotment about the shaft of vertical bolt 48 which is mounted through a pair of lugs 50 welded to the outside of the side wall 36. A torsion spring 51 having one end resting against the wall 36 and another against an outer rim of the hay dog 47 forces the latter inwardly into the path of the charges of crop material which are pushed rearwardly by the plunger 24. The hay dog 47 has a forward edge 53 extending at an acute angle from the wall 36 and a rearward edge 54 extending at a substantially right angle from the wall 36 when the hay dog 47 is in its rest position shown in FIG. 3. The hay dog assemblies 44 are mounted at such distance from the gearbox 27 that the rearward edges 54 of the hay dogs 47 are positioned in alignment with or slightly in front of the rearwardmost position of the plunger 24 during its compression stroke.

The hay dogs 47 are received in a series of longitudinal slits 56 in the sides of the plunger body such that they are not engaged by the plunger 47 itself during each stroke of the plunger mechanism. Consequently, when no fresh crop material is introduced into the baling chamber 18 and the baler is running idle, the hay dogs 47 remain in their inward position shown in FIG. 3.

However, when the stuffer mechanism 20 introduces a new charge of crop material into the baling chamber 18, it will be engaged by the plunger 24 and shoved rearwardly along the hay dogs 47. The crop material slides along the forward edge 53 of the hay dogs 47 and pushes the latter outwardly. At the end of the compression stroke, when all crop material has been conveyed beyond the hay dog assemblies 44, the action of the springs 51 brings the hay dogs 47 back to their rest positions. When the plunger 24 retracts and starts travelling forwardly again, the compressed package of crop material tends to dilate and its front face expands in the direction of the plunger. However the material is held back by the rear edges 54 of the hay dogs 47 on both sides of the baling chamber. Consequently the front face of the package is stabilized and the inlet opening in the bottom wall 38 will not be obturated thereby, such that further charges of crop material may be introduced into the baling chamber 18 without any hindrance thereto.

The hay dog assemblies 45 in the top wall 37 are similar in structure and operation and do therefore not require a further detailed description.

The movement of the hay dog assemblies 44, 45 is indicative of an introduction of a fresh charge of crop material into the baling chamber 18. This movement is sensed by means including a switch 60, which is mounted to a vertical support plate 61 welded above the hay dog assembly 44 to one of the side walls 36 (FIG. 3). The switch 60 comprises a pivotable member 62 which is engaged by the hay dog 47 when the latter is pushed outwardly by a new charge passing along this portion of the side wall 36.

The magnitude of the force by which the crop material is compressed, is measured by a load sensor 75 which is installed between the plunger gearbox 27 and the baler frame 11. The reaction forces from the package in the baling chamber 18 are transmitted via the plunger 24, the pitman rods 25 and the crank arms 26 upon the gearbox 27 whereof the lower portion is bolted onto the frame 11. The reaction force at the top of the gearbox 27 is measured by the load sensor 75 which hence provides an output signal proportional to the plunger forces. Such load sensor 75 may be of the type described in European Patent No. 0,389,322, published May 27, 1987 in the name of C. R. Sudbrack, et al. Alternatively, the plunger load may also be established by a pair of wrist pins 76 which connect the rods 25 to the body of the plunger 24. Such pins 76 may be hollow and equipped with shear stress sensors such a strain gauges for measuring the load on the plunger 24, as described in European Patent No. 0,223,350, published Sep. 26, 1990 in the name of Michel H. Mathis.

Figure 4:
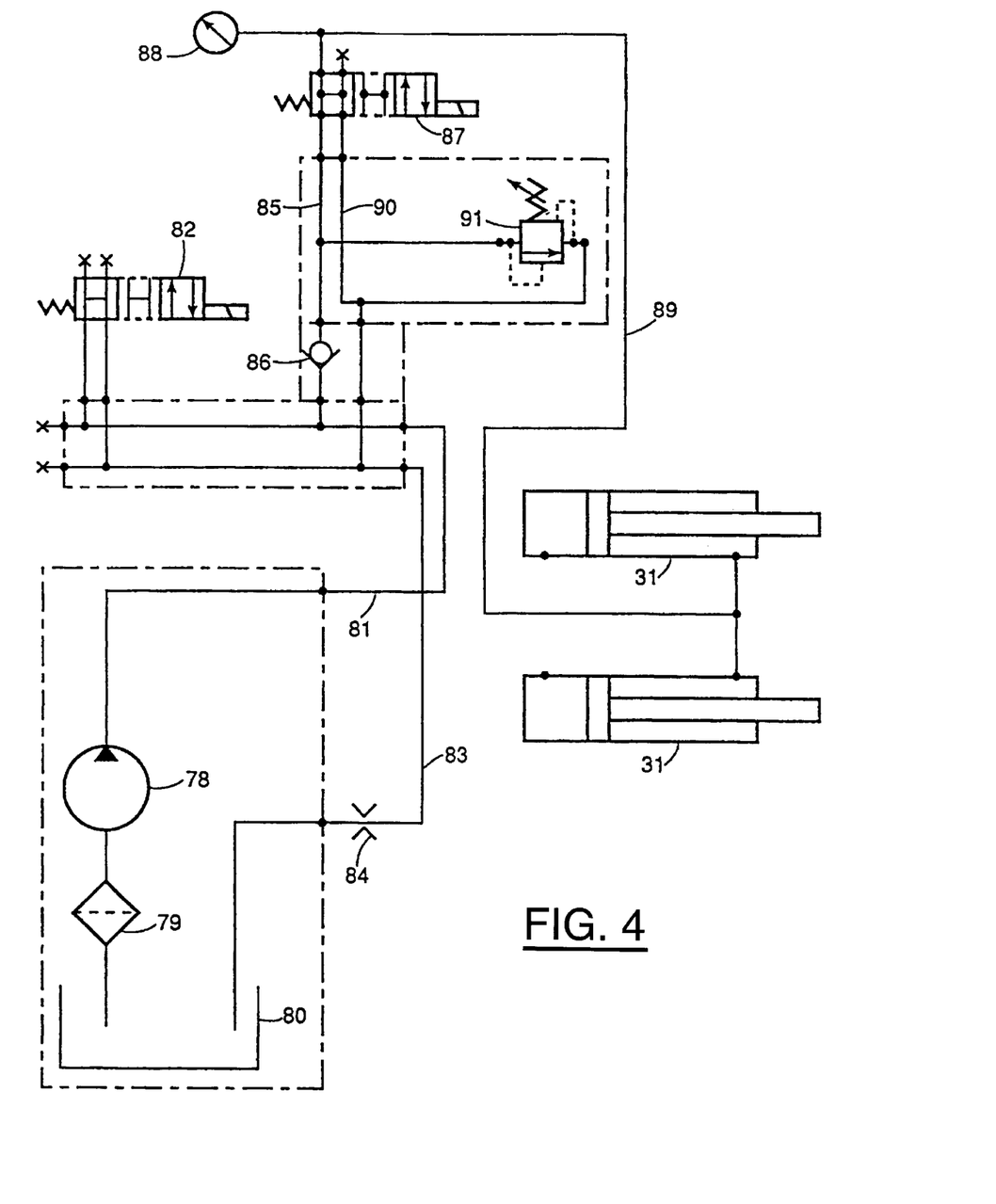
FIG. 4 is a hydraulic scheme illustrating the operation of the density control system.
Figure 5:
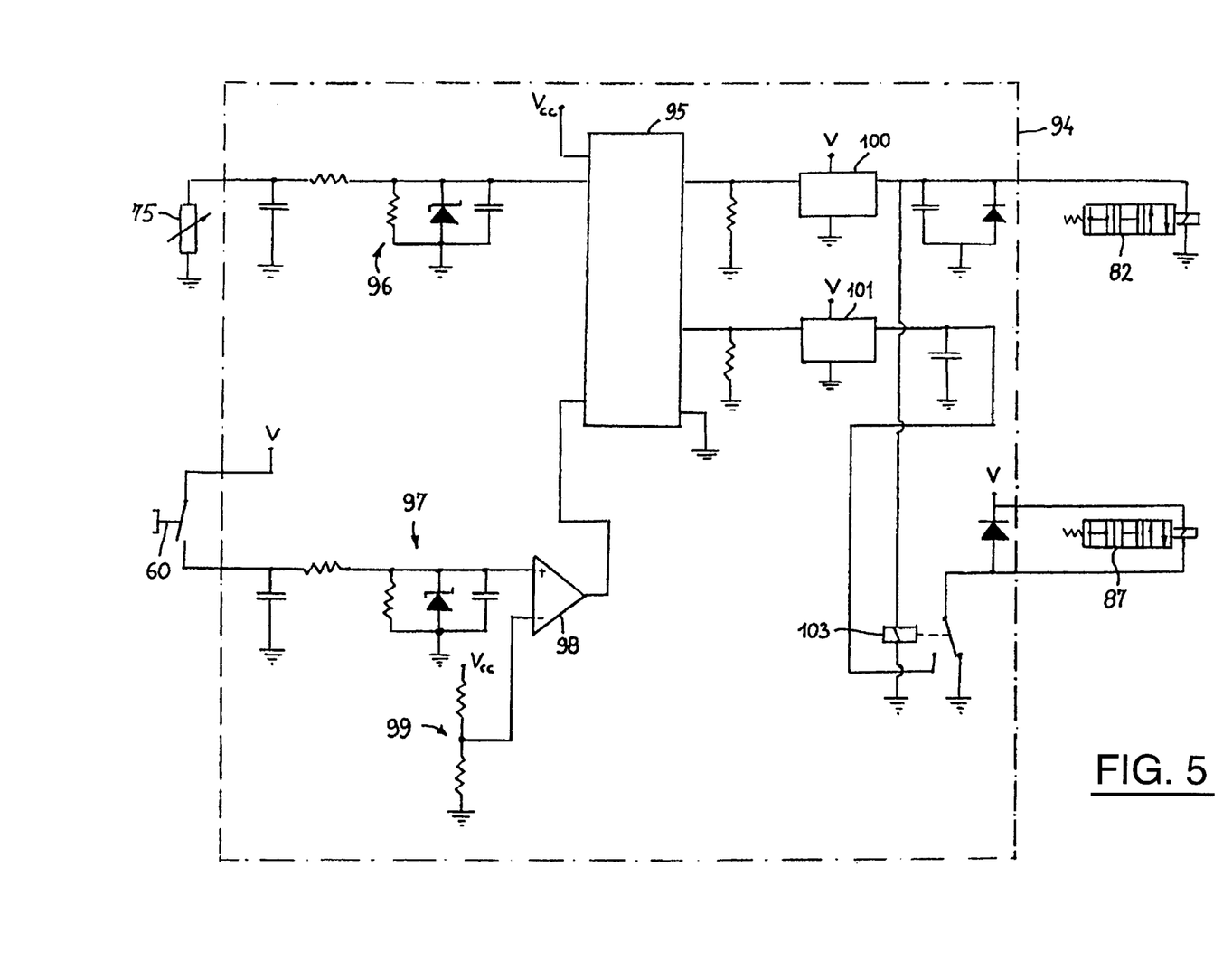
FIG. 5 is a simplified electric circuit diagram used in explaining the operation of the density control system.

The density control system comprises hydraulic circuitry in accordance with FIG. 4. Herein a continuously operated gear pump 78 takes hydraulic oil via a filter 79 from an oil tank 80. The oil is fed via a pressure line 81 to a solenoid-operated by-pass valve 82. When this valve is in its rest position as shown in FIGS. 4 and 5, the oil is drained back to the oil tank 80 via a return line 83 which is provided with an orifice 84 which has a slight pressurizing effect on the oil in the return line 83. When the by-pass valve 82 is actuated and shifted to left, the oil from the pump 78 can no longer escape via the return line 83 and pressurized oil is supplied via a non-return valve 86 and a further pressure line 85 to an inlet port of a solenoid-operated density control valve 87. The corresponding outlet port is connected to a supply line 89 equipped with a manometer 88 for displaying the oil pressure in the density control circuit. The supply line 89 is linked to the rod ends of the hydraulic cylinders 31 which control the position of the movable wall portion 30. When in its rest position the control valve 87 links the pressure line 85 and the supply line 89 to a return line 90 which is connected to the return line 83. Conventionally, the oil pressure in the pressure line 85 is limited by a pressure relief valve 91.

When the solenoid of the control valve 87 is actuated to shift the valve core to the left, the line 89 is disconnected from the return line 90. When no pressurized oil is available at the inlet port, e.g. because the by-pass valve 82 is not actuated, the oil in the lines 85, 89 is blocked by the non-return valve 86 and the pressure relief valve 91, such that the cylinders 31 are blocked also to hold the wall portion 30 in its position. Otherwise, when the by-pass valve 82 is actuated, pressurized oil will be provided to the control valve 87 and. therefrom to the cylinders 31. Oil is added to the rod end chambers of the cylinders and the wall portion 30 is pulled inwardly to reduce the cross section of the baling chamber 18. When the solenoid of the valve 87 is deenergized, its outlet port is reconnected to the return line 90 and oil may flow from the cylinders 31 to the oil tank 80, thereby permitting extension of the cylinders 31 and enlargement of the baling chamber cross section.

The signals from the hay dog switch 60 and the load sensor 75 or 76 are used in the density control system, which further comprises a circuit board 94 (FIG. 5) for analyzing these baler signals and energizing or deenergizing the solenoids of the by-pass valve 82 and the control valve 87 in response thereto. The circuit board 94 includes a microprocessor 95, for example of the Microchip type PIC16C73, which is provided with erasable memory means into which a program can be loaded in accordance with the description given hereafter.

The output of the load sensor 75 is linked via a diode protected resistor circuit 96 to an analogous input pin of the microprocessor 95. The hay dog switch 60 is connected via another diode protected resistor circuit 97 to the positive input pin of a comparator 98. A voltage divider 99 provides a reference voltage to the negative input pin of the comparator 98. The output pin of the comparator is linked to a digital input gate of the microprocessor 95. When the switch 60 is closed by the movement of the hay dog 47, the positive input pin of the comparator 98 is linked to a voltage source V and the comparator provides a HIGH to the digital input port of the microprocessor 95. When the switch 60 opens again, the voltage on the positive input pin of the comparator 98 drops below the reference voltage and a LOW is provided to the input port of the micro-processor 95.

Two output gates of the microprocessor 95 are connected to the input pins of two of electronic switches 100, 101, such as Smartfets of the type BTS413A. The output pin of the switch 100 is connected to the solenoid of the by-pass valve 82. When actuated the switch 100 provides an actuating current to the solenoid for shifting the valve 82 to the left. The solenoid of the control valve 87 is connected between the voltage source V and a relay 103. At rest this relay connects the solenoid to ground such that the valve 87 is actuated and shifted to the left. The relay 103 is controlled by the output of Smartfet 100. When the latter is low, the relay 103 is not actuated and the solenoid of the control valve 87 remains energized.

The other pin of the relay 103 is connected to the output pin of the Smartfet 101. When the relay 103 is energized and the Smartfet 101 is not actuated, the output pin of the latter is connected to ground and the solenoid of the control valve 87 is energized to keep the valve 87 in its leftmost position. Otherwise, when the relay 103 is energized and the Smartfet 101 is actuated, the voltage source V is connected to the output pin and the relay 103. As the same voltage is provided to both contacts of its solenoid, the valve 87 is deactivated and returns to its rest position shown in FIGS. 4 and 5.

The program loaded into the microprocessor 95 screens the input signals from the load sensor 75 and the hay dog switch 60 and provides an output to the Smartfets 100, 101 in accordance with the description following below.

Figure 6:
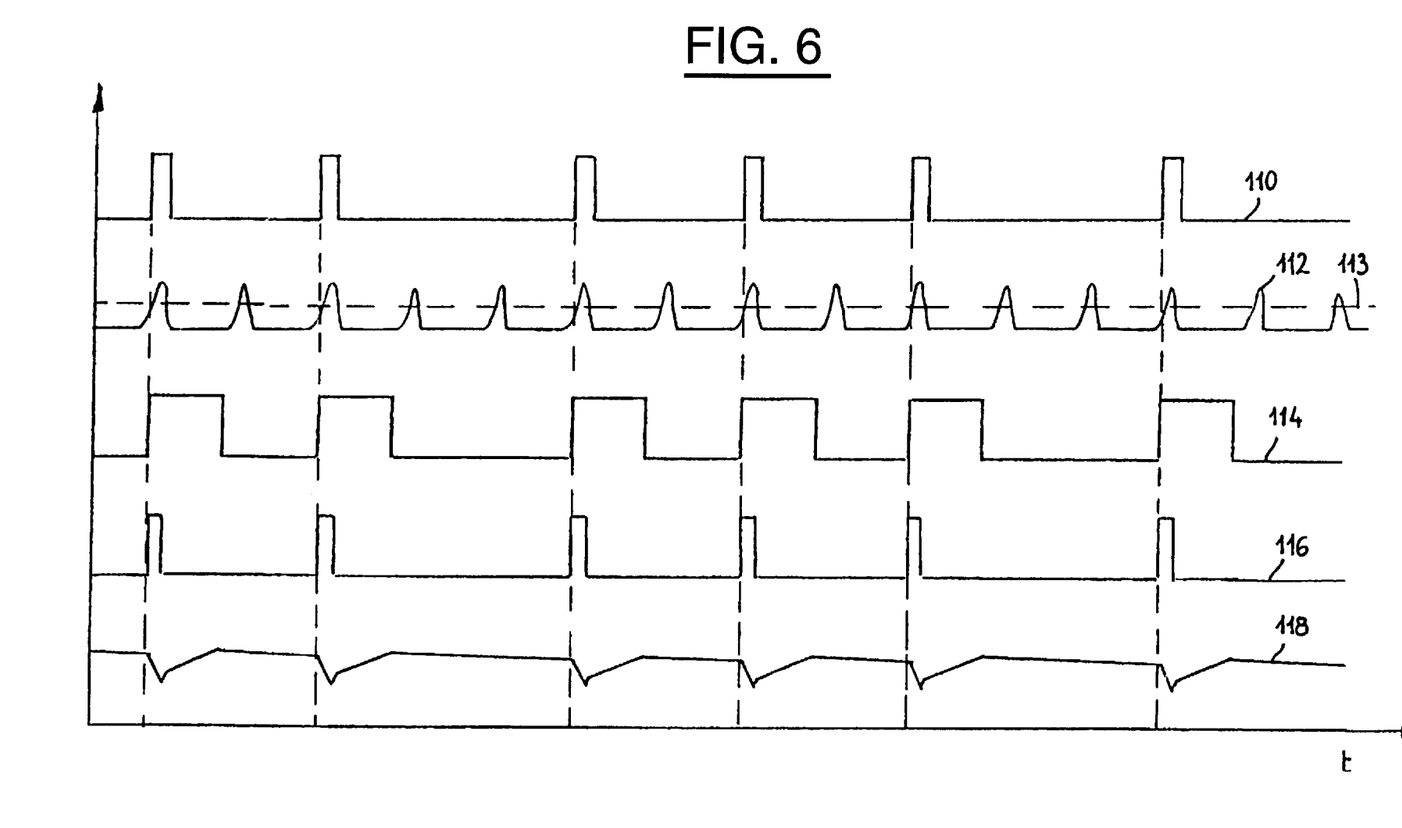
FIG. 6 is a set of graphs illustrating the operation of various components of the density control system.

The microprocessor 95 monitors the input from the hay dog switch 60. A graph 110 showing a typical evolution of this input is depicted in FIG. 6. When the switch 60 closes, the voltage provided to the digital input pin of the microprocessor 95 raises from LOW to HIGH. When such rising flank is detected, it is assumed that a new charge has been introduced into the baling chamber 18 and the program sets a HIGH to the output pin of the microprocessor 95 for energizing the solenoid of the by-pass valve 82. The program resets this output after an interval which is slightly shorter than the cycle time of the plunger 24. This interval may be about 1.2 sec long. The output of Smartfet 100 is shown in graph 114 in FIG. 6. During this actuation interval pressurized oil is provided to the control valve 87.

While the by-pass valve 82 is actuated, the program disregards any further changes to the output of the switch 60. Hence, an intermediate opening and/or closing of the switch, which might follow from a rebounce in the switch mechanism, will not affect the output of the micro-processor 95.

After the actuation interval, the program resets the value at the output pin and the by-pass valve 82 is de-energized, thereby ending the further supply of pressurized oil to the control valve 87.

The microprocessor 95 samples the signal from the load sensor 75 at a rate of 10 Khz. The program adds up the results from 10 consecutive samples and calculates their mean value to establish a new load value. Hence this value is updated at a rate of 1 Khz. The evolution of the established load values is illustrated by graph 112 in FIG. 6.

The density control program further compares the established plunger load values to a threshold value (dashed line 113) which has been selected by the baler operator. When the mean load value exceeds this threshold value, the program sets the output of the microprocessor 95 to the Smartfet 101 to HIGH in order to connect the output of the latter to the voltage source. In case the Smartfet 100 is energized already by a recent passage of crop material along the hay dog switch 60, the voltage is transferred upon the contact of the density control valve 87. The evolution of the tension at the contact of the valve solenoid is represented by graph 116 in FIG. 6.

As the same tension is being applied to both contacts of the solenoid, the valve 87 returns to its rightmost position and oil from the bale chamber cylinders 31 is permitted to flow back to the oil tank 80.

When the plunger 24 has reached its rearmost position and starts retracting again, the load on the plunger will decrease accordingly as shown by graph 112. The program still monitors this load and when the established mean load value falls below the threshold value 113, it puts a LOW on the output pin of the microprocessor 95 for resetting the Smartfet 101. The output pin of the latter is connected to ground for energizing the solenoid of the valve 87 again. The valve returns to its leftmost position, thereby connecting the cylinder line 89 to the pressure line 85.

As long as the time interval for actuating the by-pass valve is not over yet, pressurized oil is available at the control valve 87 and the cylinders 31 will retract to diminish the cross section of the baling chamber 18.

After this interval, the by-pass valve is no longer actuated and the relay 103 returns to its rest position shown in FIG. 5. The contact of the solenoid of the control valve 87 is now connected to ground by the relay 103 and the valve 87 is maintained in its left position. The oil in the cylinders 31 is now trapped by the non-return valve 86 such that the position of cylinders 31 and of the movable wall portion 30 will not change anymore.

The resulting evolution of the oil pressure in hydraulic line 89 at the outlet port of the control valve 87 is illustrated by graph 118. When a new charge of crop material has been detected by the hay dog switch 60, the by-pass valve 82 and the relay 103 are enabled. The load peak detected by sensor 75 de-energizes the control valve 87 and oil is permitted to flow back to the oil tank 80 via orifice 84. The pressure in line 85 diminishes gradually, until the value of the measured load falls below the threshold value (113). The control valve 87 is reactuated and the pressurized oil is pumped to the cylinders 31. When the predetermined time interval is over, the by-pass valve 82 returns to its rest position and no more oil is added to the cylinder line 89. The valve 87 remains actuated and the non-return valve 86 closes, thereby blocking the oil in the line 89 and the cylinders 31. The pressure in the line 89 remains substantially constant until the next charge of crop material has been fed to the baling chamber 18. However there may still be a small fall of cylinder pressure, following mainly from the relaxation of the crop package in the baling chamber 18.

In summary, during normal baling operations, a new charge of crop material is pushed rearwardly inside the baling chamber 18 by the plunger 24. The passage of the charge along the portion of the wall which is equipped with the hay dog assembly 44, triggers the switch 60 and the program consequently actuates the by-pass valve 82 for a fixed time interval, during which pressurized oil is supplied to the density control valve 87. The compression of the new charge causes an excessive plunger load, which is sensed by the load sensor 75 and the control valve 87 is deactivated permitting a drain of a portion of the oil from the cylinders 31. When the plunger 24 returns to its front position, the plunger load falls below the selected threshold value and the control valve 87 is energized again. Oil is added to the cylinders 31 until, at the end of the fixed interval, the by-pass valve 82 is deactivated and the oil pressure at the inlet port of the control valve 87 drops. The non-return valve 86 closes and blocks the oil in the cylinders 31, thereby securing the position of the movable wall portion 30.

Hence the introduction of a new charge of crop material causes at first an increase in bale chamber section during a first interval, followed by a decrease of the section during a second interval. The resulting position of the movable wall portion 30 depends on the ratio between these two time intervals. The higher and wider the load peak sensed by the load sensor 75, the longer the first interval will be and the larger the bale chamber section will be. When the load peak is lower, the first interval will be shorter and more oil will be added to the cylinders 31, causing a decrease of the bale chamber section. After the introduction of several similar charges of crop material, an equilibrium will be reached in which the amount of oil drained during each compression stroke is equal to the amount of oil added in between the compression strokes.

It may be seen from graphs 110 and 112, that substantial load peaks may be detected, even when no new charge of crop material has been introduced into the baling chamber 18. These load peaks follow from the impact of the plunger 24 on the front of the package, which tends to expand forwardly during the retraction stroke of the plunger. However these peaks do not influence the setting of the movable portion 30 of the baling chamber as the relay 103 is not actuated and keeps the solenoid of the control valve 87 connected to ground. The actuated valve 87 and the non-return valve 86 block the oil in the supply line 89 and maintain the cylinders 31 in their positions.

Consequently, on the headlands, where no new charges are stuffed up into the baling chamber 18, the density control system precludes a readjustment of the movable wall portion 30 in response to the loads sensed by the sensor 75: the load controlled steering signal from the Smartfet 101 is interrupted by the relay 103. Furthermore no pressurized oil is available at the inlet port of the control valve 87, as the by-pass valve 82 is not actuated.

Although the invention has been described with reference to a particular type of rectangular baler, other embodiments can be thought of, without departing however from the original idea of the invention.

For instance, as suggested above, it may also be used in connection with load sensors applied to the wrist pins 76 or the pitman rods 25 of the plunger 24. It is also conceivable to derive the introduction of a new charge of crop material from the movement of one of the other hay dog assemblies 44 or 45. In the embodiment described above the sensor switch 60 monitors the movement of a hay dog 47 installed above the baling chamber slot 40. This position has the advantage that the risk for contamination of the switch 60 by stray straw or hay particles is substantially less than below the slot 40. One may also monitor the movement of the hay dog assemblies 45 in the top wall 37 of the baling chamber, but then one should reckon with the possibility that an incomplete charge might not reach up to the top wall 37 and that the monitored hay dog assembly 45 hence would not be engaged although a substantial amount of material is going to be compressed against the package in the baling chamber 18.

The mechanical switch 60 may also be replaced with contactless sensors such as proximity switches or optical sensors. It is also conceivable to monitor the movement of another member which has been installed on one portion of a wall of the baling chamber 18 for the sole purpose of establishing the passage of a new charge of crop material therealong and which has no function in retaining the package during the reverse stroke of the plunger 24.

While preferred structure in which the principles of the present invention are shown and described above, it is to be understood that the invention is not limited to such structure, but that, in fact, widely different means of varying scope and configuration may be employed in the practice of the invention.

Having thus described the invention, what is claimed is:

1. In a density control system for an agricultural baler, which comprises a baling chamber comprising a plurality of walls, including at least one movable wall section, and means for introducing charges of crop material into said baling chamber and a plunger for compressing said charges to a package of said crop material therein, said density control system comprising charge sensing means for sensing the introduction of a new charge of crop material into said baling chamber and generating an output indicative of said introduction, load sensing means for sensing the force applied on said charge during compression thereof and generating an output indicative of said force, and actuator means for adjusting the position of said movable wall section in response to the output of said load sensing means and the output of said charge sensing means in order to vary the density of said package of crop material, the improvement comprising said charge sensing means comprising means operable to sense the passage of a newly introduced charge of crop material along at least one wall portion of said baling chamber, a pivotable member protruding through said at least one wall portion into the path of said charges of crop material, and a sensor sensing the movement of said pivotable member.

2. A density control system according to claim 1, wherein said pivotable member is operable to retain at least part of said package after compression by said plunger.

3. A density control system according to claim 1, wherein said pivotable member is mounted to a side wall or a top wall of said baling chamber.

4. A method for controlling the density of packages of crop material in an agricultural baler, which comprises a baling chamber comprising at least one movable wall section, and means for introducing successive charges of crop material into said baling chamber for forming a package of said crop material therein and a plunger for compressing said charges to a package of said crop material therein, said method comprising the steps of, in any convenient order i) monitoring the introduction of a charge of crop material into said baling chamber, ii) monitoring the load on said plunger during the compression of said charges, and iii) adjusting the position of said movable wall section in response to the load on said plunger only when a new charge of crop material has been introduced into said baling chamber, said method being characterized in that said introduction monitoring step (i) comprises sensing the passage of a newly introduced charge of crop material along at least one wall portion of said baling chamber, and sensing the movement of a pivotable member protruding through said at least one wall portion.

5. A method according to claim 4, characterized in that said adjusting step comprises precluding any movement of said movable wall section when no passage of a newly introduced charge of crop material along said at least one wall portion is sensed.

6. A method according to any of the claims 4, characterized in that said adjusting step (iii) comprises enabling adjustment of said movable wall section to increase the density of said package during a fixed time interval after each introduction of a new charge of crop material.

* * * * *